United States Patent [19]

Laverty, Jr.

[11] Patent Number: 4,709,427

[45] Date of Patent: Dec. 1, 1987

[54] DISABLER SYSTEM FOR PLUMBING FIXTURE

[75] Inventor: Martin J. Laverty, Jr., Earlyville, Va.

[73] Assignee: Coyne & Delany Co., Charlottesville, Va.

[21] Appl. No.: 781,944

[22] Filed: Sep. 30, 1985

[51] Int. Cl.⁴ ............................................. E03D 11/00
[52] U.S. Cl. ........................................ 4/427; 137/398
[58] Field of Search .................... 4/427, 415, DIG. 3, 4/DIG. 15; 137/396–399, 360, 412, 413, 430, 433; 251/28, 29, 41

[56] References Cited

U.S. PATENT DOCUMENTS

| | | | |
|---|---|---|---|
| 1,815,384 | 7/1931 | Tracy | 4/427 |
| 1,956,086 | 4/1934 | Tracy | 4/427 |
| 3,117,761 | 1/1964 | Billeter | 251/57 |
| 3,695,288 | 10/1972 | Billeter et al. | 137/360 |
| 3,778,023 | 12/1973 | Billeter | 251/41 |
| 3,908,204 | 9/1975 | Hopkins | 4/DIG. 3 |
| 4,041,557 | 8/1977 | Ringler | 4/427 |
| 4,203,173 | 5/1980 | Morris et al. | 4/427 |
| 4,309,781 | 1/1982 | Lissau | 4/DIG. 3 |
| 4,498,203 | 2/1985 | Barnum et al. | 4/427 |
| 4,552,331 | 12/1985 | Smart | 4/427 |

FOREIGN PATENT DOCUMENTS 4635   1/1977   Japan ................................ 4/DIG. 3

OTHER PUBLICATIONS

Lyons, Jerry L., P. E., *Lyons' Valve Deigner's Handbook*, pp. 239–241, Van Nostrand Reinhold Co., New York, Cincinnati, London, Toronto, Melbourne, Copyright 1982 by Van Nostrand Reinhold Company.

*Primary Examiner*—Henry J. Recla
*Assistant Examiner*—L. J. Peters
*Attorney, Agent, or Firm*—McAulay, Fields, Fisher, Goldstein & Nissen

[57] ABSTRACT

A flush valve operating arrangement, having a pair of tubes between a flush valve actuator assembly and a remotely controlled unit for operating a flush valve; a third tube under supply line pressure is connected between the flush valve and the remotely controlled unit, which is responsive to supply line pressure from the third tube, and a control, coupled with the pair of tubes and with a fixture connected with the flush valve, responsive to water level in the fixture for prevention of actuation of the flush valve actuator assembly by the remote unit to thereby prevent overflow of the fixture and flooding of a surrounding area.

A water level sensor is associated with the fixture, and includes a piston-housing assembly having an inlet and an outlet associated with the housing, a plunger associated with the water level sensor device either to isolate the inlet from the outlet or to place them into communication depending on the level of water in the fixture, and a bleed inlet line connected from one pair of the tubes to the inlet, and an outlet line connected from the water level sensor to a drain for diverting water in the one tube to the drain when the sensor activates the plunger to place the inlet and the outlet into communication and the remotely controlled unit is operated to place the pair of tubes into communication with the third tube.

39 Claims, 11 Drawing Figures

DISABLER SYSTEM FOR PLUMBING FIXTURE

BACKGROUND OF THE INVENTION

This invention is concerned with controlled operation of a remotely located flush valve from a readily accessible operating mechanism.

More particularly, the present invention is concerned with supplying water or other liquid to areas in relationship to the quantity removed to avoid damage or flooding.

The invention is particularly useful in installations subject to misuse, vandalism as well as outright excess supplying of water, in particular, to plumbing installations.

More particularly, the present invention is useful in penal institutions, where it is desired to provide the least amount of accessibility either directly or indirectly to operating controls for a fixture to which water is to be supplied, and specifically to a urinal or toilet bowl to which flush water is to be supplied.

In many plumbing installations, it is desirable that the flush valves for flushing water closets and urinals be concealed as well as out of reach of a user and yet be readily accessible for operation by a user, for example. In certain installations, such as in prisons for example or in other non-normal situations, the user may stuff the water closet and cause overflow and flooding of the surrounding area. In other installations, playful mischievousness may also result in a blockage of the discharge passage of the water closet. What-ever the cause, blockage of the discharge passage is an undesirable situation and overflow and flooding is to be avoided.

The invention also proposes the use of a readily accessible flush valve actuator not requiring user hand actuation. In some situations and locations, it is desirable that a water closet be flushed without having to depend on the user.

There are instances on record where inmates in prisons have purposely and deliberately clogged plumbing fixtures and then continued to operate the mechanism for supplying water to cause flooding of the fixture and the surrounding environs.

DESCRIPTION OF THE PRIOR ART

U.S. Pat. No. 3,695,288 to Billeter et al describes an enabler system comprising a hydraulic actuated flush valve hydraulically actuated by a push button valve. The push button is connected to the inlet supply line and to a piston in the flush valve coupling, primarily to take care of roughing-in variations. However, this patent also discloses an orifice in the piston of the flush valve actuating unit to provide and, according to statements made in this patent, to insure the positive operation by providing for a pressure drop across the piston. The opening in the piston is made smaller in diameter than an opening into the flush tube of the flush valve.

However, the opening in the piston tends to clog, due to unwanted particles of dirt in the water stream, as well as due to corrosive action which takes place on the piston. Moreover, since the opening in the piston is eccentrically disposed relative to the central axis thereof and its associated cylinder housing, the piston is eccentrically loaded and wears unevenly and can become loose and result in a stopping action with respect to the aforesaid cylinder.

SUMMARY OF THE INVENTION

The present invention proposes to overcome the foregoing disadvantages and provide for a novel remotely controlled actuator and hydraulic mechanism together with a flush valve enabler and flush valve disabler system.

The flush valve disabler system is designed in conjunction with the hydraulic actuated flush valve. The disabler unit is designed to prevent the premeditated as well as the accidental act of a user flooding the plumbing fixture by clogging the trapway and repeatedly flushing the flush valve, causing the fixture to overflow. When this device is used, the first flooding or overloading of the fixture will activate the system and prevent further flooding or overloading. The system will then have to be reset manually to restore it to normal operation.

To provide for an enabler system or a hands-free operation of a urinal or a water closet, a sensor is combined with the flush valve actuator for the operation thereof. The sensor is provided with a time delay mode to prevent operation in response to a passer-by. The sensor includes a hold mode so that distinction is made between a passer-by and a user. Once a user moves away or out of range from the sensor, a signal is sent to the flush valve for the operation thereof. Here also, since the sensor can be used in a public installation or a prison installation, it is desirable to use the disabler system in conjunction with the enabler system.

The invention also provides for a sleeve in the flush valve piston actuator assembly to by-pass the water around the piston, rather than through the piston, and thereby prevent misalignment thereof after prolonged and continuous operation.

A primary object of the invention is to prevent the deliberate overflow of plumbing fixtures such as a urinal or a water closet in prisons and other public installations due to malicious operation of plumbing items by users.

Another object of the invention is to prevent flooding of an area surrounding a plumbing fixture as a result of the continuous supply of excess water thereto while the plumbing system is not operating to remove the water therefrom.

A further object of the present invention is to provide a water by-pass to by-pass the piston in the flush valve actuator assembly.

DESCRIPTION OF THE PREFERRED EMBODIMENTS

Figure 1:
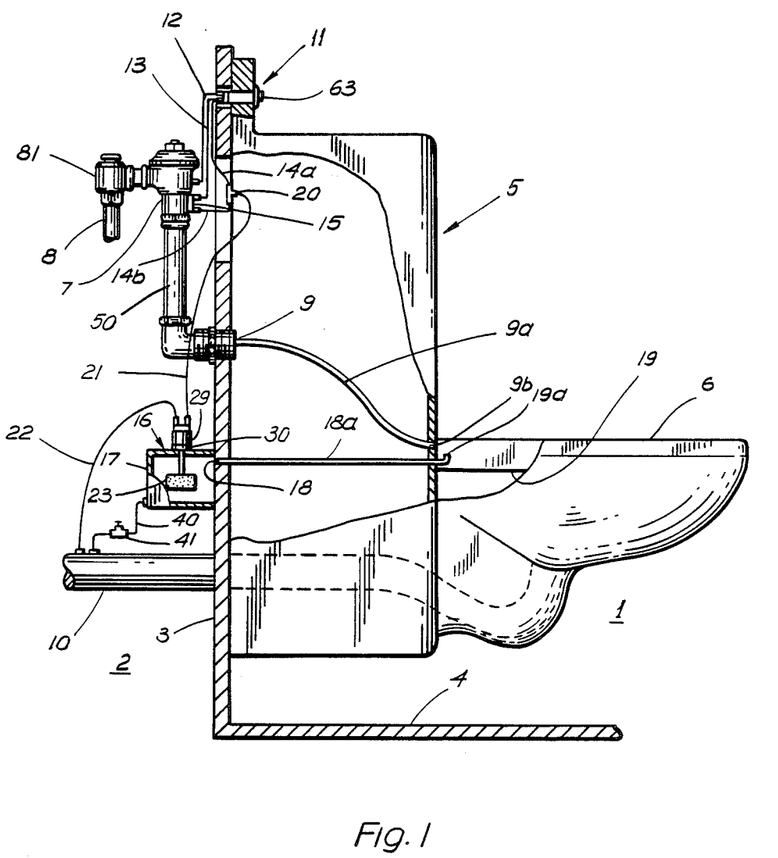
FIG. 1 is a schematic illustration of an installation with a flush valve disabler system provided with an exposed and readily accessible push button actuator, a concealed flush valve, a concealed sensor float valve fluidly connected with an exposed water closet partially broken away to show some of the internal arrangements, and a concealed float valve drainer.

Referring now more particularly to the drawings which illustrate the presently preferred mode for carrying out the invention, FIG. 1 illustrates a typical installation with an exposed area 1 and a concealed area 2 separated by a typical wall 3 and floor 4 with a wall hung water closet fixture 5 having a bowl portion 6. The installation also includes a commercially known flush valve such as a "Delany Hydro-Flush Valve" 7 with a conventional water inlet 8 and water outlet 9 through line 9a into water closet 5 and drain 10 schematically shown. A push button actuator 11 is either positioned on wall 3 or on fixture 5 (actuator on wall not shown on drawing) and has a water inlet line 12 from flush valve 7. Two water connection lines 13 and 14 (line 14 is composed of lines 14a and 14b) are connected from push button actuator 11 to fittings 13x and 14x on housing 72 (FIG. 4) of a flush valve actuator assembly 15 for actuating the flush valve in response to actuation of push button actuator 11.

To provide for means to prevent supply of water to fixture 5 when it can hold no more flush water and prevent bowl overflow, sensor 16 is provided behind wall 3 to prevent access thereto by any unauthorized persons. Sensor 16 includes a housing 17 which has an opening 18 connected with a pipe 18a in communication with wash down rim 19 of bowl 6 so that float 23 of sensor 16 will sense the height of the water level in the bowl. Opening 19a to pipe 18a is concealed within the rim 19 of bowl 6 or below to prevent access thereto and to prevent blockage.

While opening 19a is shown concealed within rim 19, it is also possible to place opening 19a below the rim.

Figure 3:
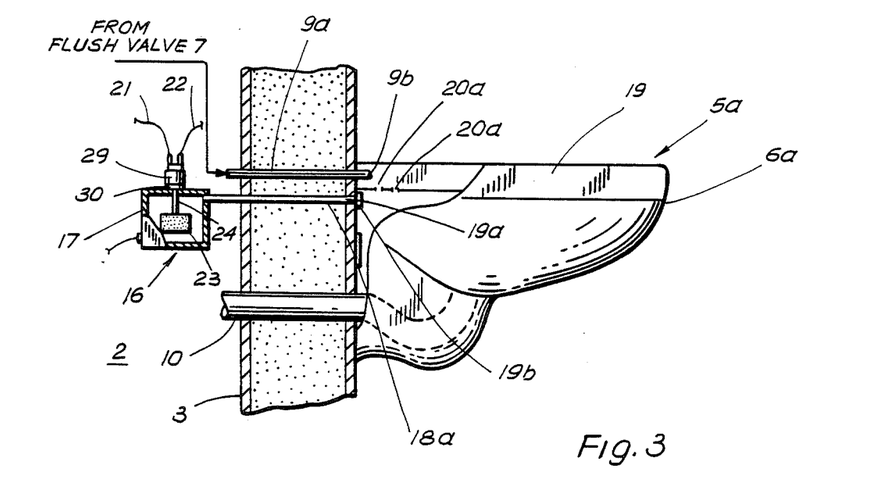
FIG. 3 is a partial schematic illustration of the installation of FIG. 1 showing the sensor float valve located proximate to the rim of a bowl and exposed.

A modification of the installation of FIG. 1 is shown in FIG. 3, with housing 17 located behind wall 3 in concealed area 2 and connected by means of pipe 18a to bowl 6a below wash down rim 19 of bowl 6a of water closet 5a with opening 19a of pipe 18a opening into bowl 6a so that the water level in the bowl will be measured by the water level entering into housing 17. In this embodiment, opening 19a is shown below wash down rim 19, but it can also be provided in a concealed manner in the wash down rim 19. When opening 19a is below wash down rim 19, then a housing 19b is used to conceal opening or inlet 19a to sensor 16. Rim 19 includes conventional openings 20a through which flush water is supplied as in FIG. 1 through line 9a to water outlet 9b from flush valve 7 concealed behind wall 3. Flush water passes through conventional openings 20a to flush bowl 6a, and when the water level is too high because there is a blockage in drain 10a, the water flow direction back flows and no longer passes through opening 20a but passes into opening 19a to pipe 18a to sensor 16.

The operation of the FIG. 1 embodiment of bowl 6 of fixture 5 is the same with water back flowing its flow and passing into opening 19a from the bowl 6 when the water level has reached the level of opening 19a.

Line 14 includes a T-connection 20 to provide for a water connection from push button actuator 11 to sensor 16 and is composed of lines 14a and 14b connected together through the T-connection 20 to flush valve actuating assembly 15 and connected with a bleed line 21 from T-connection 20 which forms an inlet line to sensor 16. Sensor 16 includes an outlet line 22 to the drain 10 located in concealed area 2 behind wall 3. As will be explained further, when sensor 16 is open to render lines 21 and 22 in fluid or hydraulic communication, push button actuator 11 no longer can cause or initiate operation of the flush valve actuator assembly 15. Tubes 12, 13, 14a, 14b, and 21 are isolated from the fixture 5 by wall 3 or the rear portion of the fixture 5.

Figure 2:
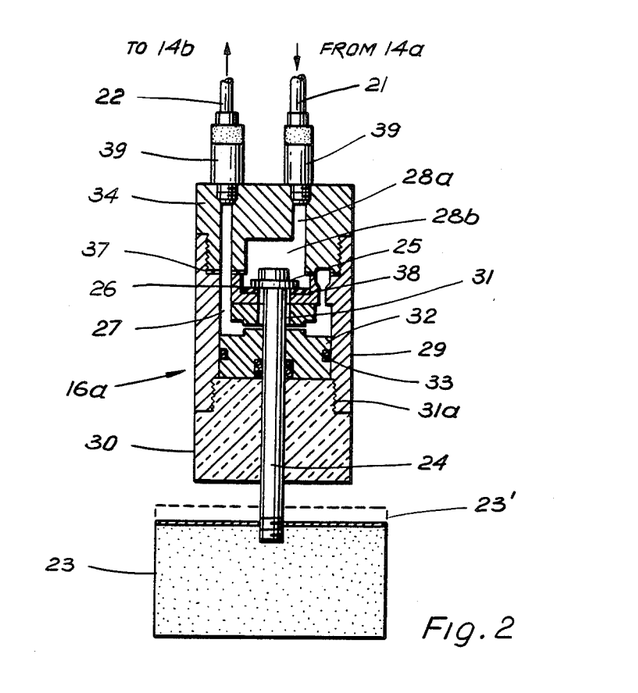
FIG. 2 is a sectional view of the sensor float valve used with the disabler system of FIG. 1.

Referring now more particularly to FIG. 2, sensor 16 is shown with housing 17 omitted for clarity and includes float 23 coupled with a sensor valve 16a having a pusher or piston rod 24 carrying a sealing piston 25 closing or seating onto seat 26. Inlet line 21 and outlet line 22 are isolated from each other when sealing piston 25 is seated onto seat 26. Line 21 receives water fed from line 14a through T-connection 20 then into line 21 and into a first chamber 28b in sensor valve 16a which is separated from second chamber 27 when piston 25 is seated onto seat 26, and when piston 25 is moved off from seat 26, it communicates with inlet line 21, and chamber 27 opens into outlet line 22 and feeds into line 14b.

Sensor valve 16a includes, outside housing 17, a body portion 29, a flange bushing 30 having a passage 31 therethrough to guide and control the direction of movement of piston rod 24, flange bushing 30 being threadedly connected with body portion 29 at threaded connection 31a below passage 31. Fitted within body portion 29 is piston rod guide 32 and provided with sealing O-ring 33. Received within the other end of body portion 29 is a passage separator 34 having an inlet portion or channel 28a which communicates with chamber 28b to form a first chamber. Washer 37 is provided to seal body portion 29 to passage separator 34. Seat 26 is also provided with washer 38 to provide a tight seal between sealing piston 25 and seat 26. Conventional fittings 39 are screwed into and received in passage separator 34 for connection of lines 21 and 22 thereto.

To provide for the removal of water from housing 17 and allow float 23 to reseat sealing piston 25 onto seat 26, a withdrawal line 40 (see FIG. 1) with a valve 41 is provided to exhaust the water in housing 17 into drain 10.

OPERATION OF DISABLER SYSTEM

The flush valve disabler system is operated by means of sensor 16 located behind wall 3 in concealed area 2 and includes pipe 18a for connection with rim 19 or the rim of bowl 6, as shown in FIG. 1 and in FIG. 3.

The sensor 16 is connected between the flush valve 7 and push button actuator valve 11. Sensor 16 can also be designated as a sensor float valve because it is composed of valve 16a and float 23.

Under normal operation, when the push button actuator valve 11 is operated, this opens a chamber in the actuator valve, as will be explained further in connection with the operation of the actuator valve 11, letting water pressure flow equally into two tubes or lines 13 and 14, one tube 13 going directly to piston actuator assembly 15 on the flush valve and the other tube 14 having a first tube or line portion 14a going to sensor float valve 16 through T-connection 20 and tube 21 and to piston actuator assembly 15 through second tubing or line portion 14b. The sensor float valve 16 is normally closed; this lets the water pressure from the push button actuator valve 11 to flow equally in the two tubes 13 and 14 going to piston actuator flush valve assembly 15 on the flush valve after filling line 21 from T-connection 20 to sensor 16. The water pressure enters the piston actuator assembly equally pushing the piston (as explained subsequently) forward to trip the flush valve.

When float 23 of sensor 16 senses the water level and rises or moves inwardly to a position as shown in dotted outline 23' due to a blockage in the waste outlet or drain 10 or the fixture, it will open chamber 28a in the sensor float valve and place it into communication with chamber 27 through passageway 31 around piston or plunger rod 24 so that lines 21 and 22 are connected and water from line 14 flows through line 14a, T-connection 20 through line 21, through sensor 16a to line 22 into the drain. When the user operates the push button actuator valve, the water going to the two tubes 13 and 14 will not enter piston assembly 15 equally and apply pressure thereto from the two lines 13 and 14. This water pressure will be diverted to sensor valve 16a and therethrough and be dumped into the drain 10, letting no water pressure build up in piston actuator assembly 15 from line 14 (composed of lines 14a and 14b) to push the piston thereof and a relief stem or valve stem 70 (see FIG. 4) on the flush valve, thus making the system inoperative to operate flush valve 7 and have flush water enter bowl 6.

The system can be reset from behind wall 3 by opening valve 41 and draining the water out of the sensor float valve storage chamber defined by housing 17 after blockage is removed from drain 10.

Figure 4:
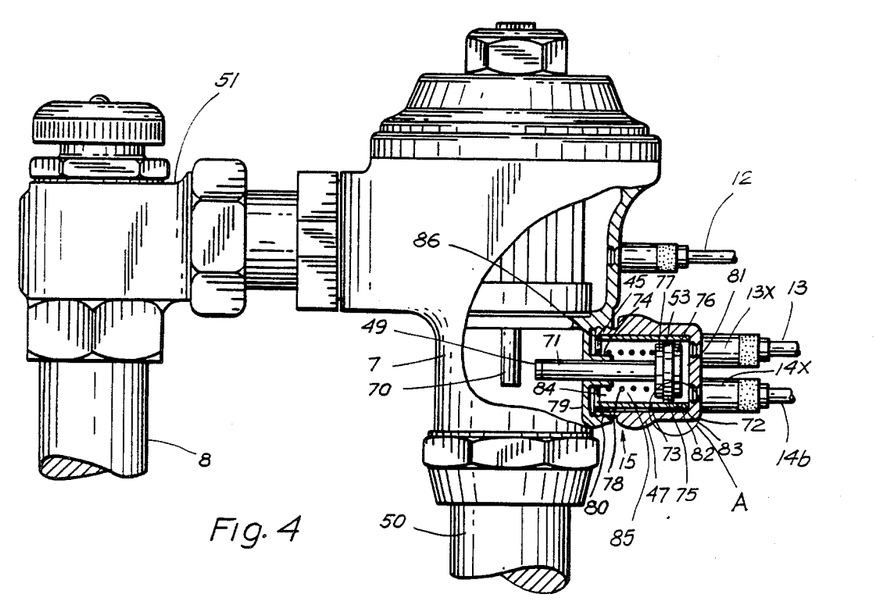
FIG. 4 is a partially perspective view and partially in section of a hydro-flush valve and a flush valve piston actuator assembly for use with and forming an operating part of the disabler system of FIG. 1.
Figure 5:
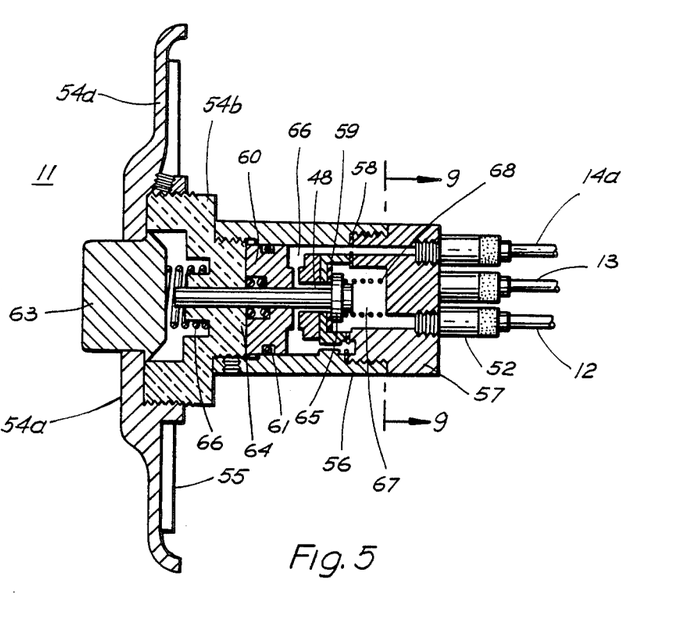
FIG. 5 is a sectional view of the push button actuator used in connection with the disabler system of FIG. 1.
Figure 6:
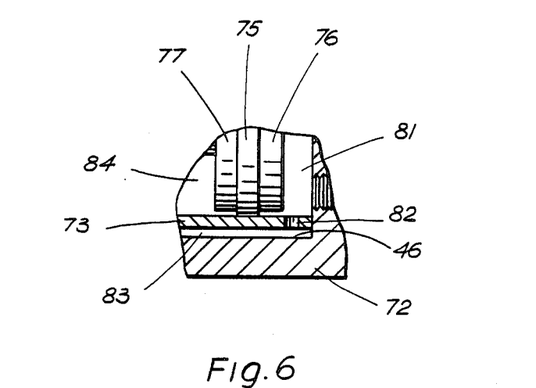
FIG. 6 is an enlarged detailed showing of the portion of FIG. 4 encircled in A.

Referring now to FIGS. 4 and 5, push button actuator 11 is connected and operatively associated with flush valve 7 through tubes 13 and 14, and like parts are designated with the same reference numerals as in FIGS. 1 to 3.

Flush valve 7 includes water inlet 8 and water outlet 50 which, when extended, connects with water outlet 9 into fixture 5 and stop control valve 51. Line 12 which is desirably formed of flexible plastic cabling or tubing for ease of installation is connected with water inlet 52 to push button actuator and valve 11. Through water line or conduit 13 water is supplied under pressure to the face of piston 65. Tubes 13, 14 and 21 may also be formed of flexible tubing and placed in the concealed area behind wall 3.

Flexible tube 12 is normally under constant hydraulic pressure from the water supply line 8 and the inlet side of the flush valve, while flexible tubes 13 and 14 (14a and 14b) as well as tube 21 are normally at zero line pressure.

The details of the push button actuator 11 and its manner of connection to a wall surface form no part of the invention, and the actuator includes a face plate 54a suitably held by a wall mounting member 54b to mounting wall 55 and includes casing 56.

Pushbutton actuator valve 11 includes a passage separator 57, washer 58, seat washer 59, O-rings 60, 61, spring 62 to hold push button 63, disengaged from pusher rod 64 carrying piston 65. Chamber 66 is provided on one side of piston 65 and chamber 67 is provided on the other side thereof and, together with seat washer 59 and washer 58 seals off water inlet line 12 from water outlet lines 13 and 14, when piston 65 is held seated on washer 59 by spring 68 and water pressure from tube 12 to isolate chambers 66 and 67 from each other.

When push button 63 is pushed to overcome the pressure of spring 62, push button 63 engages the end of pusher rod 64 and moves piston 65 away from or off washer 59 to render outlet chamber 66 in fluid communication with inlet chamber 67. Outlet chamber 66 is in fluid communication with lines 13 and 14 and inlet chamber 67 is fed by water inlet line 12. Flush valve piston actuator assembly 15 (as will be explained) is only operable in response to water being supplied thereto through both lines 13 and 14 simultaneously and through line 14b directly to flush valve piston actuator assembly 15. The O-rings 60, 61 effectively seal off face plate 54a and wall mounting member 54b from outlet chamber 66 to prevent leakage.

Flush valve 7 includes valve stem 70, the end of which cooperates with push rod or plunger 71 and allows water to exit through water outlet pipe to, for example, toilet bowl 6a, or equivalent.

Flush valve piston actuator assembly 15 comprises a housing 72, an inner sleeve 73 and piston 53 carried by plunger 71 having nylon tip portion 49.

Piston 53 has a cup washer which includes a center washer 75 between two outer facing plates 76, 77 to create a better seal.

Axial movement of plunger 71 in housing 72 is controlled by washerless sleeve bearing 74 and sleeve 73 which guides piston 53. Piston 53 which comprises center washer member 75 provides a fluid-tight fit with the inner wall of sleeve 73. Piston 53 is spring-urged by spring 78 to maintain push rod or plunger 71 out of engagement with valve stem 70 unless pressure is applied to facing plate 76. Spring 78 is held between facing plate 77 and wall 79 carrying sleeve bearing 74; and housing 72 is screw-threadedly held by threads 80 to wall 79. Facing plate 76 has a diametrical extent which is foreshortened relative to washer member 75.

Sleeve 73 includes at one end thereof in fluid communication with inlet chamber 81 an aperture or opening 82 to permit fluid to by-pass piston 53. Sleeve 73 is also provided with a longitudinal channel 83 (see FIG. 7) which extends along the length of sleeve 73 and permits water from chamber 81 to enter chamber 84. Water from chamber 84 also passes into water outlet 50 through a space 85 between push rod 71 and washerless sleeve bearing 74. The space 85 between push rod 71 and sleeve bearing 74 is sufficient for water to move into outlet 50 on the other side of wall 79 to empty chamber 84 while providing a suitable bearing to guide the movement of push rod 71. Piston 53 which is foreshortened because of facing plate 76 always assures access of the water to channel 83 through aperture 82.

The commercially known type flush valve such as a "Delany Hydro-Flush" valve 7 includes stop control valve 51 connected to the flush valve 7 and to the inlet water supply pipe 8. The outlet 50 of the flush 7 valve is connected to a lavatory, a urinal, a water closet, or any other types of basins. Water inlet line 12 is connected through a fitting to the water supply side of the flush valve body 7 and is "normally under water line pressure".

Water inlet line 12 is formed of tubing which is connected to the actuator valve 11 (FIG. 5) through inlet fitting 52. The piston assembly 15 has piston 53 contained inside to actuate the flush valve 7.

Lines 13 and 14b are connected through the piston assembly 15. Lines 13 and 14a "normally under no water pressure" are connected to the actuator valve 11.

When a user pushes the actuator push button 63, moving plunger 64 off its seat 59, inner chambers 48 and 66 in the actuator valve 11 permit water flow under pressure from the tubing 12 to be distributed equally into tubes or lines 13 and 14 and specifically into line 13 and line portion 14b.

The water when under pressure causes water to flow under in lines 13 and 14 and enter the piston assembly 15, distributing pressure equally on the piston 53. This pressure causes piston 53 to move inwardly to trip valve stem 70 of the flush valve 7. When the push button 63 on the actuator valve 11 is released, the flow of water in tubing 13 and 14 is terminated. The remaining water behind the piston 53 is bled-off between the piston wall sleeve 73 and piston assembly sleeve bearing 74, letting the return spring 78 return the piston 53 back to its rest position. The flush valve 7 will go through its normal operation and shut itself off.

It should be noted that when the disabler is used in conjunction with the hydro-flush 7, there is a definite and required use for the second tube 14 from the push button valve 11 to the hydro-flush. Specifically, when outlet line 22 of the disabler is in its open position, the water in the second tube 14 is being diverted from line portion 14a through bleed inlet line 21 to outlet line 22 and prevented from going to piston 53 because of the pressure build-up. If water is applied through only one tube of the two equiangularly spaced tubes 13 and 14, and the water is being diverted by the other tube 14 and specifically through line 21 because the sensor valve 16 is rendered operative, then the pressure on piston 53 is uneven and the piston is skewed and the operation is improper and there is insufficient pressure to over come the pressure of spring 78 and to operate the piston and move it. This also prevents cross-connection which can result in problems.

Figure 7:
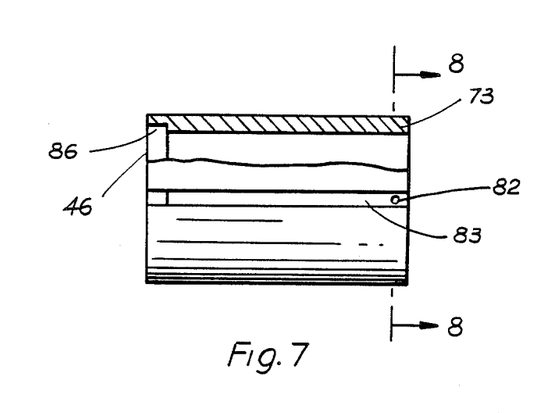
FIG. 7 is a detail showing the sleeve forming part of the flush valve piston actuator assembly shown in FIG. 4.
Figure 8:
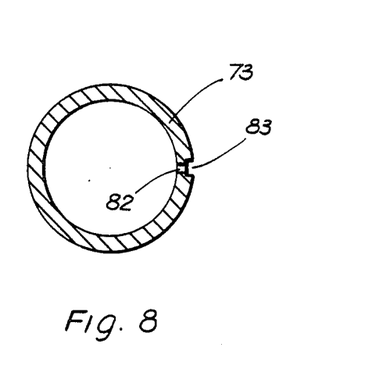
FIG. 8 is a sectional view taken on 8-8 of FIG. 7.
Figure 9:
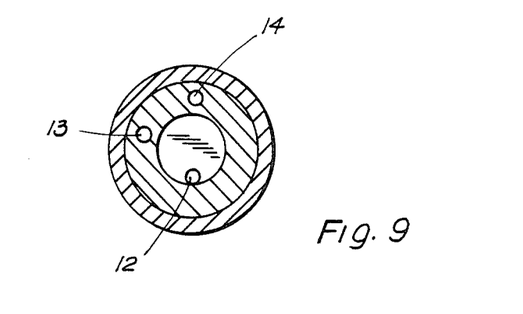
FIG. 9 is a sectional view taken on 9-9 of FIG. 5.

The by-pass through aperture 82 and into longitudinal channel 83 around the piston reduces pressure on the piston 53. By diverting the water around piston 53 and running it through the channel, operation is improved because the pressure on the piston face remains substantially constant and is not non-uniform because of the openihg or any pass-through through the piston.

The cross-sectional area of a plane perpendicular to the direction of water flow forming the opening for water flow in the aperture and the by-pass channel must be less than the combined cross-sectional areas of the flow of the water through the two tubes 13 and 14 (14a and 14b). Specifically, the cross-sectional area of the channel should be approximately one-quarter to one-half of the combined cross-sectional areas of the two tubes 13 and 14.

In the prior art, with an opening through the piston, any dirt or undesired foreign particles which is carried in the water is always directed at the piston hole or opening and generally with the same pressure and the same direction. On the other hand, by using the opening formed by aperture 82 on the sleeve 73 and the by-pass channel 83, the dirt is directed at different times at different places. While the dirt is dispersed, the dirt is not always directed with the same force and the same energy at the hole 82 in the sleeve. In addition, since the sleeve has channel 83, some of the dirt will go right through that channel onto the other side. The sleeve is preferably made from nylon, because nylon is known not to clog as much as glass or metal. However, since this is a functional material itself, and non-corrosive, the nylon also will not corrode. When the piston has to be or is made from metal, as in the prior art, it is believed that the reason that the orifice clogs is that the water is being moved in such a manner that it is constantly hitting the same spot with the dirt being directed at the same spot, so that there is a tremendous build-up.

The diameters of the tubes 12, 13 and 14 are preferably 5/32 of an inch and have complete flexibility for adjustment behind a very narrow wall, so that if they are bent they do not kink and prevent water flow through them. The cross-sectional area of the channel and hole varies between approximately one quarter and one half of the combined cross-sectional areas of tubes 13 and 14.

Where it is desired to have a finer control for the movement of the piston, three or more tubes equiangularly spaced facing the piston and directing the water to the piston may desirably be used. However, it has been found that operation with two equiangularly spaced tubes is quite satisfactory. On the other hand, a single tube which is off center has not been found to be very satisfactory and is not as good as the two tubes diametrically spaced from each other and such operation, at most, is marginal. Moreover, disabling with a single tube is possible, but the positive operation when no disabling is to take place desirably requires two tubes to provide for positive disablement by providing for skewing of piston 53 which prevents moving thereof.

The inner channel on the discharge side of the piston is undercut at 86. The reason for this is that when piston assembly nut 47 is tightened, the base 46 of the nylon or plastic sleeve liner becomes compressed and an area or a place for the material to move is required. The material seals up against the base of the housing going to the outlet so that the water does not leak out of the threads 80. The sleeve also serves the purpose of a sealing washer or at least the base portion 46 serves the purpose of a sealing washer.

Another advantage of the invention is the possibility to reduce the number of parts thereby eliminating the number of difficulties in connection with manufacturing. With the use of the sleeve, a number of the sealing rings and O-rings can be eliminated.

While discussion was had with respect to undesired foreign particles such as dirt, it should be noted that if extremely dirty water is used, even if sandy water is used, there will be less clogging in the by-pass channel 83 and aperture 82 thereto, as distinguished from clogging in an opening through the piston.

Figure 10:
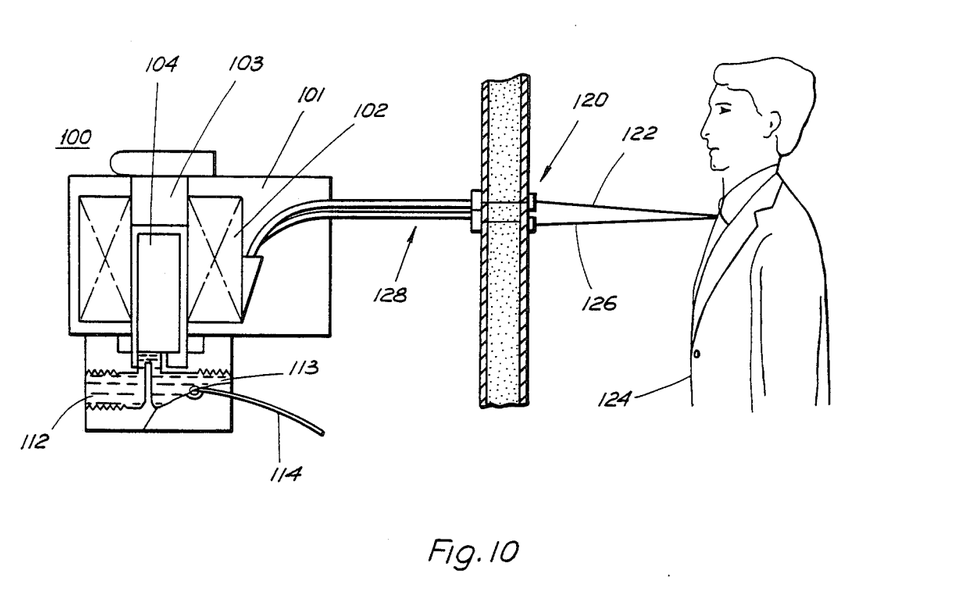
FIG. 10 is a modification of the actuator of FIG. 5 and is a solenoid operated sensor flush actuator employing an infra-red sensor to actuate a movable core to provide water flow from a valve body having a single inlet and two outlets; flow of water through a single orifice from the inlet to the two outlets is stopped or allowed in response to the action and position of the core when the solenoid is de-energized, or energized as shown.
Figure 11:
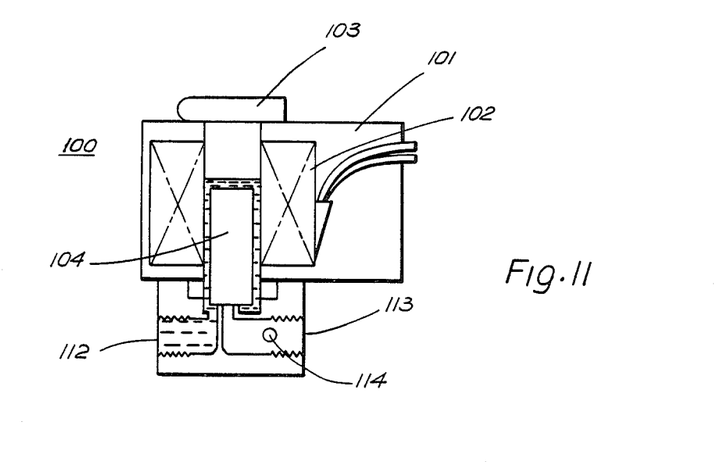
FIG. 11 is a schematic layout of the solenoid and valve and the mechanical parts in its de-energized condition.

Referring now to FIGS. 10 and 11, which show a two-way solenoid valve 100 comprising a housing 101 containing a solenoid coil 102 surrounding a stationary core 103 with a spring actuated movable core 104. An example of the type of solenoid valve found to be suitable is solenoid valve part No. 134 sv, manufactured by A.S.C.O. - Automatic Switch Company of Florham Park, N.J. The valve is provided with an inlet 112 and an outlet 113. For my purpose, I have added another outlet 114 and when the solenoid coil 102 is energized, movable core 104 is moved to place inlet 112 into fluid communication with outlets 113 and 114.

Solenoid valve 100 may suitably replace push button actuator valve 11 and inlet 112 is connected with inlet line 12 and outlets 113 and 114 are respectively connected with fittings 13x and 14x on flush valve piston actuator assembly 15.

To activate the solenoid 100, an infra-red sensor 120 on wall 3 may suitably be used to transmit through a separate interior transmission conduit 121 an infra-red radiation ray 122 which exits through separatede conduit 123; and when an individual 124 or other object is placed into its path at a pre-selected distance according to the distance desired, the individual or object 124 returns an infra-red ray 126 towards separate conduit 125 on one side of wall 3 and passes through a separate interior transmission conduit or infra-red receiving opening 127 which in turn is coupled by lines 128 to solenoid coil 102 to energize solenoid 100 for energization thereof and move movable core 104 so as to place water inlet 112 into fluid communication with water outlets 113 and 114.

Line 114 may also be connected to a T-connection 20 and be separated into lines 114a and 114b with line 114a going to the T-connnection 20 and line 114b going to fitting 14x.

Appropriate delays are used so that flushing will take place only when there is a sensed actual use so that short time activation of the solenoid 100 by infra-red sensor 120 will not activate the flushing mechanism. Desireably, the sensor is provided with at least a two seconds delay (although a longer delay may be provided), then the sensor activates the solenoid valve to start the water flow. The sensor stays on until the user is out of range and water flow stops when the user is out of range.

Solenoid valve 100 is particularly usable in connection with urinals. However, such valve is also usable in connection with drinking fountains, hospitals, where there is a desire to have automatic water control as well as in industrial establishments.

While there has been shown and described what is considered the present preferred mode of carrying out the invention, various changes and modifications may be made therein without departing from the scope of the invention.

What is claimed is:

1. In a toilet having a flush valve operating arrangement, including: toilet fixture for holding water;
   a flush valve connected to said fixture;
   a flush valve actuator assembly associated with said flush valve;
   a remotely controlled operated unit;
   a pair of tubes extending between said flush valve actuator assembly and said remotely controlled operated unit;
   a third tube under water supply line pressure connected between said flush valve and said remotely controlled operated unit, means in said remotely controlled operated unit for connecting the water supply line pressure from said third tube with said pair of tubes for actuating said actuator assembly;
   water level sensor means hydraulically connected with at least one of said pair of tubes and hydraulically connected with said fixture to be flushed;
   said water level sensor means being responsive to water level in the fixture and including means for relieving water supply line pressure in said at least one of said pair of tubes when a predetermined water level is sensed for prevention of actuation of said flush valve actuator assembly by said remotely located operated unit to thereby prevent overflow of the fixture and flooding of a surrounding area; and
   means between said fixture and said tubes for isolating said tubes from said fixture;
   said isolating means being separate and apart from said fixture and preventing access to said tubes.

2. In the arrangement of claim 1, wherein said actuator assembly includes:
   a housing having two inlets, one for each of said pair of tubes;
   a sleeve assembly in said housing including a sleeve and by-pass means associated with said sleeve; and
   a piston having a solid face slidable within said sleeve in response to the supply line pressure being supplied to said solid face of said piston by both said tubes of said pair of tubes simultaneously and with substantially equal hydraulic pressure in each said tubes for actuating said flush valve;
   said by-pass means cooperating with said remotely controlled operated unit to provide for communication between said pair of tubes and the outlet of said flush valve to said fixture to permit drainage of said pair of tubes and said housing into the fixture through said outlet of said flush valve, thereby providing for uniform pressure over the face of said piston proximate to said pair of tubes.

3. In the arrangement of claim 2, wherein said sleeve has an inner circumferential extent conforming to the outer circumferential extent of said piston and has a longitudinal channel on the outer surface thereof coaxial with and concentrically spaced from the central axis of said housing and a transverse opening from an inside portion of said sleeve opening into said channel, and said piston includes an outer plate having a foreshortened diametrical extent to provide access to said longitudinal channel from said transverse opening for all positions of said piston.

4. In the arrangement of claim 1, wherein said means associated with said pair of tubes includes:
   a water level sensor device operatively associated with said fixture;
   a piston-housing assembly including an inlet and an outlet associated with said housing, a plunger operatively associated with said water level sensor device either to isolate said inlet from said outlet or to place them into communication depending on the level of water in the fixture; and
   a bleed inlet line connected from one said pair of tubes to said inlet, and an outlet line connected from said water level sensing device to a drain for by-passing water in said one pair of tubes to said drain when said sensor device activates said plunger to place said inlet and said outlet into communication and said remotely controlled operated unit is operated to place said pair of tubes into communication with said third tube.

5. In the arrangement of claim 4 wherein said water level sensor device includes a float for sensing the height of the water level in the fixture.

6. In the arrangement of claim 4, wherein said piston housing assembly is isolated from the fixture, and including means fluidly connecting the fixture to said piston-housing assembly while maintaining isolation of said piston-housing assembly and the fixture.

7. In the arrangement of claim 1, wherein said remotely controlled operated unit is a push-button operated member.

8. In the arrangement of claim 1, wherein said remotely controlled operated unit includes an infra-red sensor responsive device for placing said third tube into communication with said pair of tubes.

9. In the arrangement of claim 8, wherein said infra-red sensor responsive device includes a two seconds time delay to provide for selective operation.

10. In the arrangement of claim 1, including an infra-red sensor actuating device coupled with said remote operated unit for activation thereof in response to an object returning infra-red rays transmitted from said sensor actuating device to said sensor actuating device for connecting said remote operated unit with the inlet supply side of said flush valve, said pair of tubes being normally at zero line pressure and being subjected to said supply line pressure in response to said sensor actuating device being activated for rendering said flush valve actuator assembly operative to operate said flush valve, means separate from said first flush valve actuator assembly and associated therewith for bleeding off supply line pressure to disable said remote operated unit.

11. In the arrangement of claim 10, including a by-pass associated with the flush valve outlet and separate from said flush valve actuator assembly for permitting excess water in said pair of tubes from said supply line to discharge into said flush valve outlet for reducing the line pressure in said third tube when said remote operated unit is restored.

12. In the arrangement of claim 1, wherein said remotely controlled operated unit is a solenoid and a valve body having a single inlet and a pair of outlets, said solenoid including an actuatable movable core; said movable core being movable between a first position wherein said two outlets and said inlet are isolated from each other to a second position in which said two outlets are in communication with said inlet.

13. In the arrangement of claim 12, wherein said remotely controlled operated unit includes an infra-red sensor responsive device electrically connected with said solenoid for energizing thereof in response to an individual rendering said infra-red sensor device operative to move said movable core and place said outlets into communication with said inlet.

14. In the arrangement of claim 13, wherein said valve body includes a passage between said inlet and said outlets; said movable core sealing off said passage when said solenoid is de-energized.

15. In the arrangement of claim 1, including means between said fixture and said pair of tubes for isolating said pair of tubes from said fixture.

16. In a toilet having a flush valve operating arrangement, including a toilet fixture for holding water;
a flush valve connected to said fixture;
a flush valve actuator assembly associated with said flush valve;
a remotely controlled operated unit;
a pair of tubes extending between said flush valve actuator assembly and said remotely controlled operated unit;
a third tube under water supply line pressure connected between said flush valve and said remotely controlled operated unit, means in said remotely controlled operated unit for connecting the water supply line pressure from said third tube with said pair of tubes for actuating said actuator assembly;
means operatively coupled with said pair of tubes and with a fixture connected with said flush valve to be flushed responsive to water level in the fixture for prevention of actuation of said flush valve actuator assembly by said remotely located operated unit to thereby prevent overflow of the fixture and flooding of a surrounding area, including:
a water level sensor device operatively associated with the fixture;
a piston-housing assembly including an inlet and an outlet associated with said housing, a plunger operatively associated with said water level sensor device either to isolate said inlet from said outlet or to place them into communication depending on the level of water in the fixture; and
a bleed inlet line connected from one said pair of tubes to said inlet, and an outlet line connected from said water level sensing device to a drain for diverting water in said one of said pair of tubes to said drain when said sensor device activates said plunger to place said inlet and said outlet into communication and said remotely controlled operated unit is operated to place said pair of tubes into communication with said third tube.

17. In the arrangement of claim 16, wherein said water level sensor device includes a float for sensing the height of the water level in the fixture.

18. In the arrangement of claim 16, wherein said piston housing assembly is isolated from the fixture, and including means fluidly connecting the fixture to said piston-housing assembly while maintaining isolation of said piston-housing assembly and the fixture.

19. In the arrangement of claim 16, wherein said remotely controlled operated unit includes an infra-red sensor responsive device for placing said third tube into communication with said pair of tubes.

20. In the arrangement of claim 19, wherein said infra-red sensor responsive device includes a time delay to provide for selective operation.

21. In the arrangement of claim 16, including an infra-red sensor actuating device coupled with said remote operated unit for activation thereof in response to an object returning infra-red rays transmitted from said sensor actuating device to said sensor actuating device for connecting said remote operated unit with the inlet supply side of said flush valve, said pair of tubes being normally at zero line pressure and being subjected to said supply line pressure in response to said sensor actuating device being activated for rendering said flush valve actuator assembly operative to operate said flush valve, means separate from said first flush valve actuator assembly and associated therewith for bleeding off supply line pressure to disable said remote operated unit.

22. In the arrangement of claim 16, wherein said actuating unit assembly includes:
a housing having two inlets, one for each of said pair of tubes; and a sleeve assembly in said housing including a piston having a solid face, a sleeve associated with said housing and including by-pass means, said piston being slidable within said sleeve in response to the supply line pressure being supplied to said solid face by both said tubes of said pair of tubes simultaneously and with equal hydraulic pressure in each said tubes for actuating said flush valve;

said by-pass means cooperating with said remotely controlled operated unit to provide for communication between said pair of tubes and the outlet of said flush valve to said fixture to permit drainage of said pair of tubes and said housing into the fixture through said outlet of said flush valve, thereby providing uniform pressure over the face of said piston proximate to said pair of tubes.

23. In the arrangement of claim 22, wherein said sleeve includes a longitudinal channel coaxial with and concentrically spaced from the central axis of said housing and a transverse opening from a side of the piston remote from said outlet into said channel, and said piston including an outer plate having a foreshortened diametrical extent to provide access to said transverse opening for all positions of said piston.

24. In the arrangement of claim 16, wherein said remotely controlled operated unit is a solenoid and a valve body having a single inlet and a pair of outlets, said solenoid including an actuatable movable coil; and said movable coil is movable between a first position wherein said two outlets and said inlet are isolated from each other to a second position in which said two outlets are in communication with said inlet.

25. In the arrangement of claim 24, wherein said remotely controlled operated unit includes an infra-red sensor responsive device electrically connected with said solenoid for energizing thereof in response to an individual rendering said infra-red sensor device operative to move said movable coil and place said outlets into communication with said inlet.

26. In the arrangement of claim 25, wherein said valve body includes a passage between said inlet and said outlets; said movable coil sealing off said passage when said solenoid is de-energized.

27. In the arrangement of claim 16, including means between said fixture and said pair of tubes for isolating said pair of tubes from said fixture.

28. In a toilet having a flush valve operating arrangement, including a toilet fixture for holding water;
a flush valve connected with said fixture for controlling the flushing thereof;
a flush valve actuator assembly associated with said flush valve;
a remotely located and controlled operated unit;
a pair of tubes extending between said flush valve actuator assembly and said remotely controlled operated unit;
a third tube under water supply line pressure connected between said flush valve and said remotely controlled operated unit, means in said remotely controlled operated unit for connecting the supply line pressure from said third tube with at least one of said pair of tubes for actuating said actuator assembly;
means hydraulically connected with said pair of tubes and the fixture responsive to water level in the fixture and including means for relieving water supply line pressure in said at least one of said pair of tubes when a predetermined water level is sensed for prevention of actuation of said flush valve piston actuator assembly by said remotely located operated unit, said water level responsive means being operable in response to the quantity of flush water in the fixture to thereby prevent overflow thereof and flooding of a surrounding area; and said actuating assembly including:
a housing having two inlets, one for each of said pair of tubes and a sleeve assembly in said housing;
said sleeve assembly including a piston having a solid face, a sleeve associated with said housing and by-pass means, said piston being slidable within said sleeve in response to the supply line pressure being supplied to said solid face by both said tubes of said pair of tubes simultaneously and with substantially equal hydraulic pressure in each said tubes for actuating said flush valve; and
said by-pass means cooperating with said remotely controlled operated unit to provide for communication between said pair of tubes and the outlet of said flush valve to said fixture to permit drainage of said pair of tubes and said housing into the fixture through said outlet of said flush valve, thereby providing uniform pressure over the face of said piston proximate to said pair of tubes.

29. In the arrangement of claim 28, wherein said by-pass means includes a longitudinal channel in said sleeve coaxial with and concentrically spaced from the central axis of said housing and a transverse opening in said sleeve from a side of the piston remote from said outlet into said channel, and said piston including an outer plate having a foreshortened diametrical extent to provide access to said transverse opening for all positions of said piston.

30. In a toilet having a flush valve operating arrangement, including a toilet fixture for holding water:
a flush valve connected with the fixture;
a flush valve actuator assembly associated with said flush valve;
a remotely controlled operated unit comprising a solenoid and a valve body having a single hydraulic inlet and a pair of hydraulic outlets, said solenoid including an actuatable movable core, said movable core being movable between a first position wherein said two outlets and said inlet are isolated from each other to a second position in which said two outlets are in communication with said inlet;
a pair of tubes extending between said flush valve actuator assembly and said remotely controlled operated unit;
a third tube under hydraulic supply line pressure connected between said flush valve and said inlet of said remotely controlled operated unit, means in said remotely controlled operated unit for connecting the supply line pressure from said third tube with said pair of tubes; and
water level sensor means hydraulically coupled with at least one of said pair of tubes and including means for relieving water supply line pressure in said pair of tubes when a predetermined water level is sensed and with the fixture responsive to water level therein for prevention of actuation of said flush valve actuator assembly by said remotely located operated unit to thereby prevent overflow of the fixture and flooding of a surrounding area.

31. In the arrangement of claim 30, wherein said remotely controlled operated unit includes an infra-red sensor responsive device electrically connected with said solenoid for energizing thereof in response to an individual rendering said infra-red sensor device operative to move said movable coil and place said outlets into communication with said inlet.

32. In the arrangement of claim 30, wherein said valve body includes a hydraulic passage between said inlet and said outlets, and said movable core seals off said passage when said solenoid is de-energized.

33. In the arrangement of claim 30, including means associated with the flush valve outlet and separate from said flush valve actuator assembly for permitting excess water in said pair of tubes from said supply line to discharge into said flush valve outlet for reducing the line pressure in said third tube when said remote operated unit is restored.

34. In a flush valve operating arrangement including:
toilet fixture for holding water;
a flush valve connected to said fixture;
a flush valve actuator assembly associated with said flush valve;
a remotely controlled operated unit;
a pair of tubes extending between said flush valve actuator assembly and said remotely controlled operated unit;
a third tube under water supply line pressure connected between said flush valve and said remotely controlled operated unit, means in said remotely controlled operated unit for connecting the supply line pressure from said third tube with said pair of tubes;
an infra-red sensor actuating device coupled with said remotely operated unit for activation thereof in response to an object returning infra-red rays transmitted from said sensor actuating device to said sensor actuating device for connecting said remote operated unit with the inlet supply side of said flush valve;
said infra-red sensor actuating device comprising an infra-red radiation transmitter and an infra-red receiver, a first conduit for transmitting the infra-red transmission from said transmitter from one side of an isolation means to the other, and a second conduit separate and apart from said first conduit for transmitting infra-red transmission received from a reflecting body through said isolation means to said sensor actuating device so that the transmitted infra-red rays and the received infra-red rays are maintained separate from each other; and
said pair of tubes being normally at zero line pressure and being subjected to said supply line pressure in response to said sensor actuating device being activated for rendering said flush valve actuator assembly operative to operate said flush valve; and
means responsive to water level separate from said flush valve actuator assembly and associated therewith for bleeding off supply line pressure in said at least one of said pair of tubes when a predetermined water level is sensed to disable said remote operated unit.

35. In the arrangement of claim 34, including a by-pass associated with a drain outlet and separate from said flush valve actuator assembly for permitting excess water in said pair of tubes from said supply line to discharge positively into the drain for reducing the line pressure in said third tube when said remote operated unit is restored.

36. In the arrangement of claim 34, wherein said remotely controlled operated unit is a solenoid and a valve body having a single outlet and a pair of outlets, said solenoid including an actuatable movable coil; said movable coil being movable between a first position wherein said two outlets and said inlet are isolated from each other to a second position in which said two outlets are in communication with said inlet.

37. In the arrangement of claim 36, wherein said remotely controlled operated unit includes an infra-red sensor responsive device electrically connected with said solenoid for energizing thereof in response to an individual rendering said infra-red sensor device operative to move said movable coil and place said outlets into communication with said inlet.

38. In the arrangement of claim 37, wherein said valve body includes a passage between said inlet and said outlets; said movable coil sealing off said passage when said solenoid is de-energized.

39. In the arrangement of claim 34, wherein said means separate from said flush valve actuator assembly for bleeding off supply line pressure to disable said remote operated unit includes means response to water level in the fixture for prevention of actuation of the flush valve actuator assembly by said remotely controlled unit to prevent overflow of the fixture and flooding of the surrounding area.

* * * * *